United States Patent Office 2,881,858
Patented Apr. 14, 1959

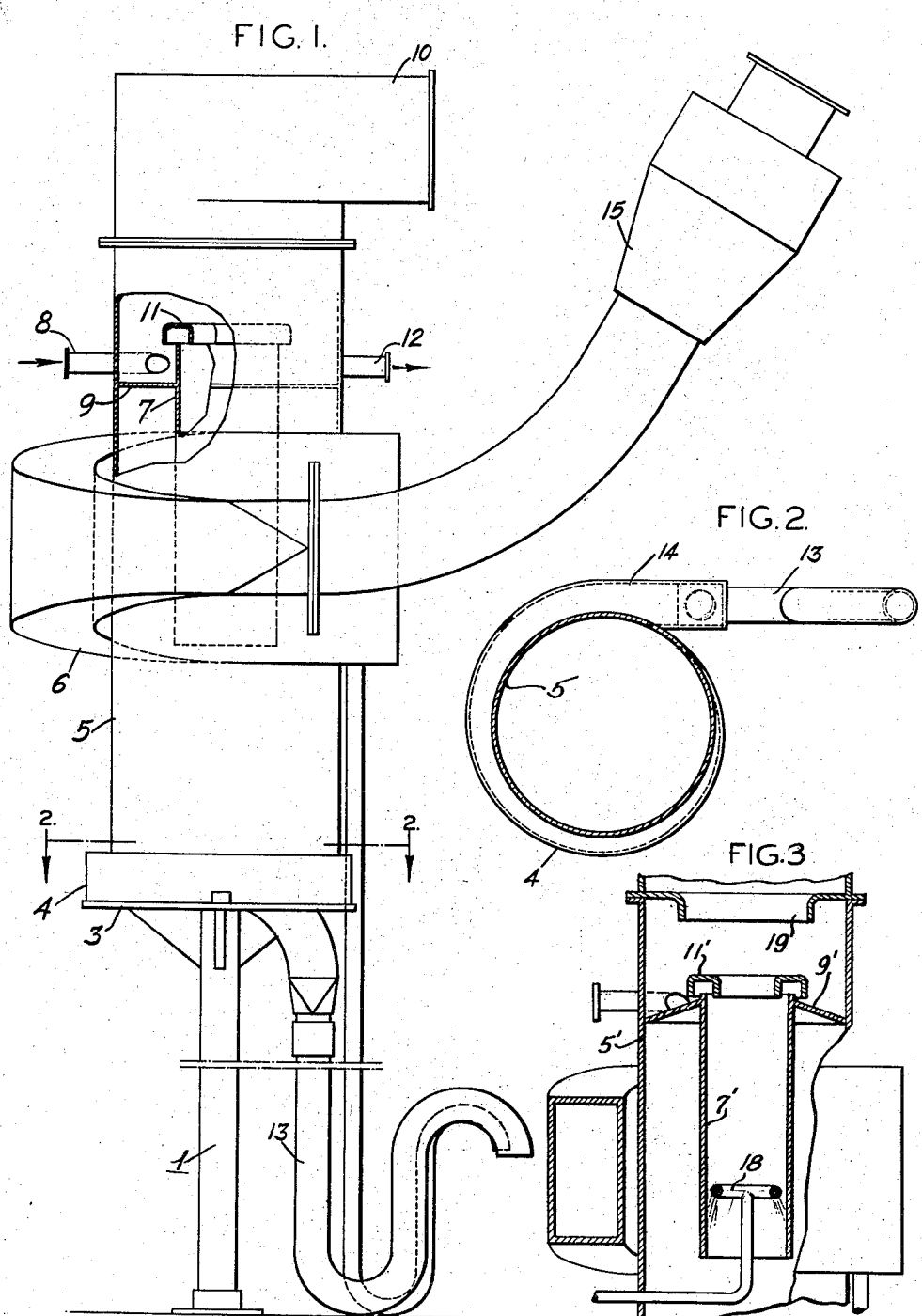

2,881,858

APPARATUS FOR SEPARATING DUST OR LIQUID DROPS FROM A GASEOUS MEDIUM

Evert Krantz and Kjell-Erik Sjalin, Stockholm, Sweden, assignors to Aktiebolaget Svenska Fläktfabriken, Stockholm, Sweden Application May 15, 1956, Serial No. 585,122

1 Claim. (Cl. 183—24)

The present invention relates to an improved apparatus for separating dust or liquid drops from a gaseous medium, which apparatus consists of a cylindrical casing having a spiral-shaped inlet, a concentrically arranged central tube as an outlet for the gaseous medium, a bottom wall and an outlet for dust, liquid or sludge.

The apparatus is characterized in that the gas inlet consists of a diffuser-shaped spiral duct extending around the major part of the exterior periphery of the casing and communicating with said casing only at the end of the duct and further characterized in that the cylindrical casing at the bottom is provided with a spirally increasing enlargement terminating into a tangential outlet for dust, liquid or sludge.

According to a preferred embodiment of the invention, a partition is disposed in the casing adjacent the outlet end of the central tube, and supply and outlet conduits respectively connected to the interior of said casing above said partition, for supplying and discharging liquid for removing dust, sludge and the like accumulated on said partition, and further characterized by an annular inverted U-shaped collar arranged above the outlet end of the central tube.

The apparatus according to the invention can preferably be used for separating of a gaseous medium containing both dust and liquid drops and can suitably be used in connection with wet separating and can in such cases be equipped with liquid distributors of known kind. Owing to the high efficiency of the invented apparatus it has proved possible to work with rather low velocities in wet separating and thus to work with small quantities of liquid.

The invention will now be described in greater detail with reference to the accompanying drawing illustrating an exemplifying embodiment of the invention, and in which Fig. 1 shows a front view of the separating apparatus;

Fig. 2 illustrates a section along the line II—II of Fig. 1; and

Fig. 3 is a sectional view showing a modification of the apparatus within the scope of the present invention.

Referring to the drawing, the apparatus comprises a cylindrical casing 5 having a spiral shaped inlet 6 for raw gas and an outlet 10 for clean gas. Preferably the inlet 6 comprises a diffuser-shaped spiral duct extending about the exterior of the casing for a major portion of its periphery, as shown in the drawing. The duct has a gradually increasing cross-sectional area and communicates with the interior of the casing only through its enlarged end. A transverse partition 9 is positioned in the casing intermediate the inlet 6 and outlet 10 and mounts a central tube 7 disposed concentrically within the casing and which serves as an outlet for the clean gaseous medium. As shown, the outlet end of the tube 7 extends above the partition 9 and is provided with an inverted U-shaped collar 11 disposed in alignment with the walls of the tube 7 above its outlet end.

The bottom of the casing 5 is formed by a bottom wall 3 and has a spirally increasing enlargement 4 which terminates in a tangential outlet 14 for dust, liquid or sludge. The height of the enlargement 4 should be 10–30% of the diameter of the casing in order to eliminate the accumulation of sludge on the bottom wall 3 within the periphery of the casing. The tangential outlet 14, if necessary, leads into a drain trap 13. The casing is mounted at an elevated position by a suitable standard 1.

In the illustrated embodiment of the invention, the apparatus is designed to be used for wet separation, and to this end a liquid distributor 15 is embodied in the inlet to introduce the moisture for wet separation into the gas stream prior to its admission into the separating chamber of the casing 5.

In the operation of the device the gaseous medium, moistened by the distributor 15, is introduced in the separating chamber 5 by the duct 6 having the gradually increasing cross-section. The expanding gaseous medium swirls into the casing about the lower portion of the tube 7, and the dust and liquid drops are deposited on the bottom wall 3 of the casing with the relatively clean gas passing upwardly through the central tube 7. Heavier particles in the gas swirling through the tube 7 are caused by centrifugal action to travel upwardly along the wall of the tube and are caught by the collar 11. From the collar 11, the particles drop onto the partition 9. In order to clean the partition 9, a liquid supply duct 8 introduces the cleaning liquid which picks up accumulated dust, sludge or the like on the partition 9 and discharges the same through the liquid outlet 12. The clean gas is discharged through the outlet 10.

In the modification illustrated in Fig. 3, the cylindrical casing 5' has a central tube 7' and an inverted U-shaped collar 11' above the tube 7' similar to the apparatus shown in Fig. 1. A partition 9' is arranged in the casing adjacent the outlet end of the tube 7', the partition being conical in form and slanting or declining toward the periphery of the casing 5. In the modification illustrated in Fig. 3, means is provided at 18 for supplying liquid against the inner surface of the lower part of the tube 7', and a drop trap 19 in the form of an annular rim arranged around the interior periphery of the casing 5', is mounted at some distance above the outlet end of the central tube 7'.

What we claim is:

An upright cylindrical casing having a top opening for the discharge of clean gas, a bottom wall, and a transverse partition intermediate said top opening and said bottom wall, a vertical tube mounted in said partition concentrically within the casing having a lower portion depending downwardly from said partition and an upper portion projecting upwardly from said partition, means to supply liquid against the inner surface of said tube in the lower portion thereof, said casing defining a separating chamber intermediate said partition and said bottom wall, a gas inlet to said separating chamber above the lower end of said central tube, an outlet for dust, liquid, sludge and the like adjacent said bottom wall, a liquid-supply conduit connected to the interior of said casing above said partition for supply liquid for fluidizing dust, sludge and the like accumulated on said partition, an outlet conduit connected to interior of said casing above said partition for discharging said fluidized material, an annular collar of inverted U-shaped cross-section mounted above the upper end of said central tube in alignment therewith, and a drop trap comprising an annular rim mounted about the interior periphery of said cylindrical casing and spaced upwardly from the upper end of said central tube below said top opening.

References Cited in the file of this patent

UNITED STATES PATENTS

| | | |
|---|---|---|
| 1,264,263 | Brassert | Apr. 30, 1918 |
| 1,577,917 | Lorraine | Mar. 23, 1926 |
| 1,930,476 | Hawley | Oct. 17, 1933 |
| 2,187,646 | Darrieus | Jan. 16, 1940 |
| 2,191,190 | De Guire | Feb. 20, 1940 |
| 2,194,361 | Linder | Mar. 19, 1940 |
| 2,346,005 | Bryson | Apr. 4, 1944 |
| 2,547,190 | Wilson | Apr. 3, 1951 |

FOREIGN PATENTS

| | | |
|---|---|---|
| 2,792 | Great Britain | Feb. 4, 1904 |
| 422,865 | Great Britain | Jan. 21, 1935 |
| 635,539 | Great Britain | Apr. 12, 1950 |
| 851,413 | France | Oct. 2, 1939 |
| 248,467 | Switzerland | Mar. 1, 1948 |